(12) United States Patent
Eklund

(10) Patent No.: US 7,916,697 B2
(45) Date of Patent: Mar. 29, 2011

(54) HANDOVER OF A MOBILE STATION

(75) Inventor: Carl Eklund, Helsinki (FI)

(73) Assignee: Nokia Corporation, Espoo (FI)

( * ) Notice: Subject to any disclaimer, the term of this patent is extended or adjusted under 35 U.S.C. 154(b) by 861 days.

(21) Appl. No.: 11/660,471

(22) PCT Filed: Aug. 17, 2004

(86) PCT No.: PCT/IB2004/002675
§ 371 (c)(1),
(2), (4) Date: Sep. 18, 2007

(87) PCT Pub. No.: WO2006/018670
PCT Pub. Date: Feb. 23, 2006

(65) Prior Publication Data
US 2008/0160999 A1 Jul. 3, 2008

(51) Int. Cl.
*H04W 36/00* (2009.01)
(52) U.S. Cl. .................. 370/331; 455/436; 455/437
(58) Field of Classification Search .................. 370/331; 455/436, 437
See application file for complete search history.

(56) References Cited

U.S. PATENT DOCUMENTS

| | | |
|---|---|---|
| 2003/0103496 A1 | 6/2003 | Lakshmi Narayanan et al. |
| 2004/0018841 A1 | 1/2004 | Trossen |
| 2005/0059437 A1* | 3/2005 | Son et al. ............... 455/574 |
| 2005/0143071 A1* | 6/2005 | Jaakkola et al. ......... 455/436 |
| 2005/0288022 A1* | 12/2005 | Ryu et al. ............... 455/439 |
| 2009/0003255 A1* | 1/2009 | Mohanty et al. ......... 370/311 |
| 2010/0317345 A1* | 12/2010 | Futaki et al. ............ 455/436 |

FOREIGN PATENT DOCUMENTS

EP 1418711 5/2004

OTHER PUBLICATIONS

R. Koodli et al; "Fast Handovers and Context Transfers in Mobile Networks;" Computer Communication Review, Association for Computing Machinery; Oct. 2001; vol. 31, No. 5, pp. 37-47; ISSN: 0146-4833, paragraphs 2 and 4.
R. Koodli et al; "A Context Transfer Protocol for Seamless Mobility;" Seamoby Working Group Internet Draft; Aug. 30, 2002; pp. 1-35; XP015004020, whole document.
"3rd Generation Partnership Project; Technical Specification Group Radio Access Network;" 3GPP TS 25.331 V6.1.0; Mar. 2004; Chapter 7 (pp. 37-40) and Annex B (pp. 1005-1034).

* cited by examiner

*Primary Examiner* — Melvin Marcelo
(74) *Attorney, Agent, or Firm* — Alfred A. Fressola; Ware, Freesola, Van Der Sluys & Adolphson LLP

(57) ABSTRACT

The invention relates to a method for supporting a handover of a mobile station 1 from a first radio access unit 3, 8 of a wireless communication network 2 to a second radio access unit 4, 9 of a wireless communication network 2. In order to improve a context transfer in the case of a handover of the mobile station 1, the mobile station 1 transmits information about its activity state to the second radio access unit 4, 9 when it is to be handed over to the second radio access unit 4, 9. The invention relates equally to such a mobile station, to such a second radio access unit, to a wireless communication system comprising such a mobile station and such a second radio access unit, and to a software code causing the transfer of information at the mobile station.

31 Claims, 5 Drawing Sheets

HANDOVER OF A MOBILE STATION

CROSS REFERENCE TO RELATED APPLICATIONS

This application is for entry into the U.S. national phase under §371 for International Application No. PCT/IB04/002675 having an international filing date of Aug. 17, 2004, and from which priority is claimed under all applicable sections of Title 35 of the United States Code including, but not limited to, Sections 120, 363 and 365(c).

FIELD OF THE INVENTION

The invention relates to a method for supporting a handover of a mobile station from a first radio access unit of a wireless communication network to a second radio access unit of a wireless communication network. The invention relates equally to a mobile station, to a radio access unit of a wireless communication network, to a wireless communication system and to a software code.

BACKGROUND OF THE INVENTION

In a wireless communication system, a mobile station may access a wireless communication network using a radio link to a radio access unit of the wireless communication network. The radio access unit can be for instance a base station of a mobile communication network.

Occasionally, a mobile station which is connected to a specific radio access unit has to be handed over to another radio access unit of the wireless communication network. For instance, when the mobile station is moving, it may leave the coverage area of the radio access unit to which it is currently connected.

In many wireless communication systems, the radio access unit to which a mobile station is handed over has to be provided with information about the mobile station, in order to be able to guarantee a smooth transition of the connection. Such information may comprise in particular an activity state of the mobile station.

A possible activity state may be for instance an Active state, in which the mobile station continuously receives relevant control information provided by the wireless communication network, for example in every frame. Another possible activity state may be for instance a Sleep state, in which the mobile station occasionally receives information on whether it should activate itself. In a 3GPP mobile communication system, the mobile station typically enters the Sleep state upon a command issued by an L2 entity in the base station to which it is associated. The base station usually issues this command when a predetermined time has elapsed after the last communication of user data by the mobile station.

Various other activity states are also possible. The technical specification 3GPP TS 25.331 V6.1.0 (2004-03) "Radio Resource Control (RRC)", Release 6, for example, gives an overview of RRC states within a Universal Terrestrial Radio Access (UTRA) RRC connected mode, including a URA_PCH state, a CELL_PCH state, a CELL_FACH state and a CELL_DCH state.

The type and the time of entry of the state of a mobile station which was entered before a handover might have to be known to a radio access unit to which the mobile station is connected after the handover. Moreover, the entry of a new state of a mobile station, which should be initiated by the radio access unit to which the mobile station is currently connected, may depend on an event which occurred while the mobile station was still connected to another radio access unit.

In current mobile communication networks, for example in networks defined by 3GPP and 3GPP2, information on the activity state of a mobile station is transferred within the network from the source base station to the target base station, possibly via intermediate nodes. This operation is typically referred to as a context transfer.

A conventional context transfer in a Universal Mobile Telecommunication Services (UMTS) network is illustrated in the diagram of FIG. 1.

In FIG. 1, a first vertical line on the left hand side represents a mobile station (MS). A second vertical line in the middle represents a first radio network controller RNC1 of the UMTS network, to which a first base station is associated. A communication between the first radio network controller RNC1 and the mobile station can be performed via this first base station. A third vertical line on the right hand side represents a second radio network controller RNC2 of the UMTS network, to which a second base station is associated. A communication between the second radio network controller and the mobile station can be performed via this second base station. The activity state of a mobile station accessing the UMTS network is kept in the radio network controllers. If the radio network controllers belong to the same radio access network, they may be directly connected to each other. Otherwise, they may communicate with each other via a core network to which they are connected.

The mobile station currently accesses the mobile communication network via the first base station. When a handover to the second base station is to be performed, the first radio network controller transmits to the mobile station a command to attach to the new cell. The mobile station transmits an acknowledgement 'ACK' of this command to the first radio network controller.

Upon receipt of the acknowledgement, the first radio network controller performs a network internal context transfer to the second radio network controller. In this context transfer, the activity state of the mobile station is indicated to the second radio network controller.

Moreover, the mobile station transmits a message to the second radio network controller, in order to make its presence known in the new cell covered by the second base station.

The context transfer from the first radio network controller to the second radio network controller via the mobile communication network has the disadvantage that it increases the latency of a handover. This is of particular relevance in 4G (fourth generation) mobile communication systems, in which the cell size of the mobile communication network is relatively small, which leads to frequent handovers when a mobile station is moving.

SUMMARY OF THE INVENTION

It is an object of the invention to improve the context transfer which is required for a handover of a mobile station from a first radio access unit of a wireless communication network to a second radio access unit of a wireless communication network.

A method for supporting a handover of a mobile station from a first radio access unit of a wireless communication network to a second radio access unit of a wireless communication network is proposed. The method comprises at the mobile station transmitting information about its activity state to the second radio access unit when it is to be handed over to the second radio access unit.

Moreover, a mobile station is proposed, which is adapted to access at least one wireless communication network via a first radio access unit of the at least one wireless communication network and via a second radio access unit of the at least one wireless communication network. The mobile station comprises a processing component, which is adapted to cause a transmission of information about an activity state of the mobile station to the second radio access unit, when the mobile station is to be handed over from the first radio access unit to the second radio access unit.

Moreover, a radio access unit of a wireless communication network is proposed, which comprises a receiving component adapted to receive from a mobile station, which is to be handed over to the radio access unit from another radio access unit of a wireless communication network, information on an activity state of the mobile station. The radio access unit further comprises a processing component adapted to make use of this information.

Moreover, a wireless communication system is propose, which comprises the proposed mobile station and the proposed radio access unit.

Finally, a software code is proposed, which is adapted to realize the proposed method when running in a processing component of a mobile station. It is to be understood that the software code may be stored in any software program product.

The invention proceeds from the consideration that a mobile station is aware of its current activity state. It is therefore proposed that when a mobile station is to be handed over from a source radio access unit to a target radio access unit of a wireless communication network, the mobile station itself provides the target radio access unit with information about its current activity state. It is to be noted that information about an activity state may include an indication of the current activity state, but equally any other activity state related information. Such information may include for instance information about events which might be relevant for a change of an activity state.

It is an advantage of the invention that it eliminates the need to establish a communication between two radio access units, or two associated controllers, in order to transfer the activity state context of a mobile station in case of a handover. This reduces the strain on a back bone network of the wireless communication network or networks, which is of particular value in case of frequent handovers.

In some wireless communication systems, it is desirable to minimize the number of protocol transactions between the mobile stations and the radio access units. In 4G mobile communication systems, for example, there exists such a need, since the symbol size on the physical layer and thus the overhead due to synchronization preambles is large. In an advantageous embodiment of the invention, the information on the activity state of the mobile station is therefore transmitted in a message which is transmitted as well for other purposes. Such a message can be for instance a message informing the second radio access unit that the mobile station is located in an area served by the second radio access unit, which has to be transmitted anyhow.

In systems in which a large amount of data is transferred over the air interface, the activity state information can be provided for instance without additional cost in place of padding.

The invention can be employed with any type of handover, and also with any kind of initialization of a handover. The mobile station may receive, for example, a command from the first radio access unit to associate itself to the second radio access unit. Alternatively, the mobile station may detect that it has lost connection to the first radio access unit and select a second radio access unit serving an area in which the mobile station is now located.

The information about an activity state of the mobile station may be selected as desired. It may comprise, for instance, an indication of a time instant of a last user data transfer between the mobile station and the first radio access unit.

The second radio access unit receives the transmitted activity state information and uses the information in the scope of the connection to the mobile station.

A radio access unit can be any unit which enables a mobile station to access a wireless communication network via a radio interface. It can be for instance a base station of a UMTS network, of a 4G network or of a wireless local area network, etc.

In some cases, a base station is provided with one or more relay base station nodes arranged at some distance of the base station. Relay base station nodes offer additional radio access options to a mobile station. Thereby, they increase the coverage area of the base station, for instance because the coverage area is limited by obstacles. In this case, a radio access unit may also comprise a relay base station node. The invention is of particular benefit, if such relay base station nodes communicate with the associated base station via the air interface using the same radio resources as the mobile stations. In case activity state information is transmitted directly by a mobile station to a target relay base station node, radio resources, which would be required for an activity state context transfer between the relay base station nodes and the base stations involved in the handover, are saved.

It is to be understood that any presented embodiment of the invention can be implemented as a method, as a software code, in a mobile station, in a radio access unit or in a wireless communication system comprising a mobile station and a radio access unit. As far as the embodiments rely on functions, the mobile station and the radio access unit comprise for the implementation means which are adapted to carry out the respective functions required at their end.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
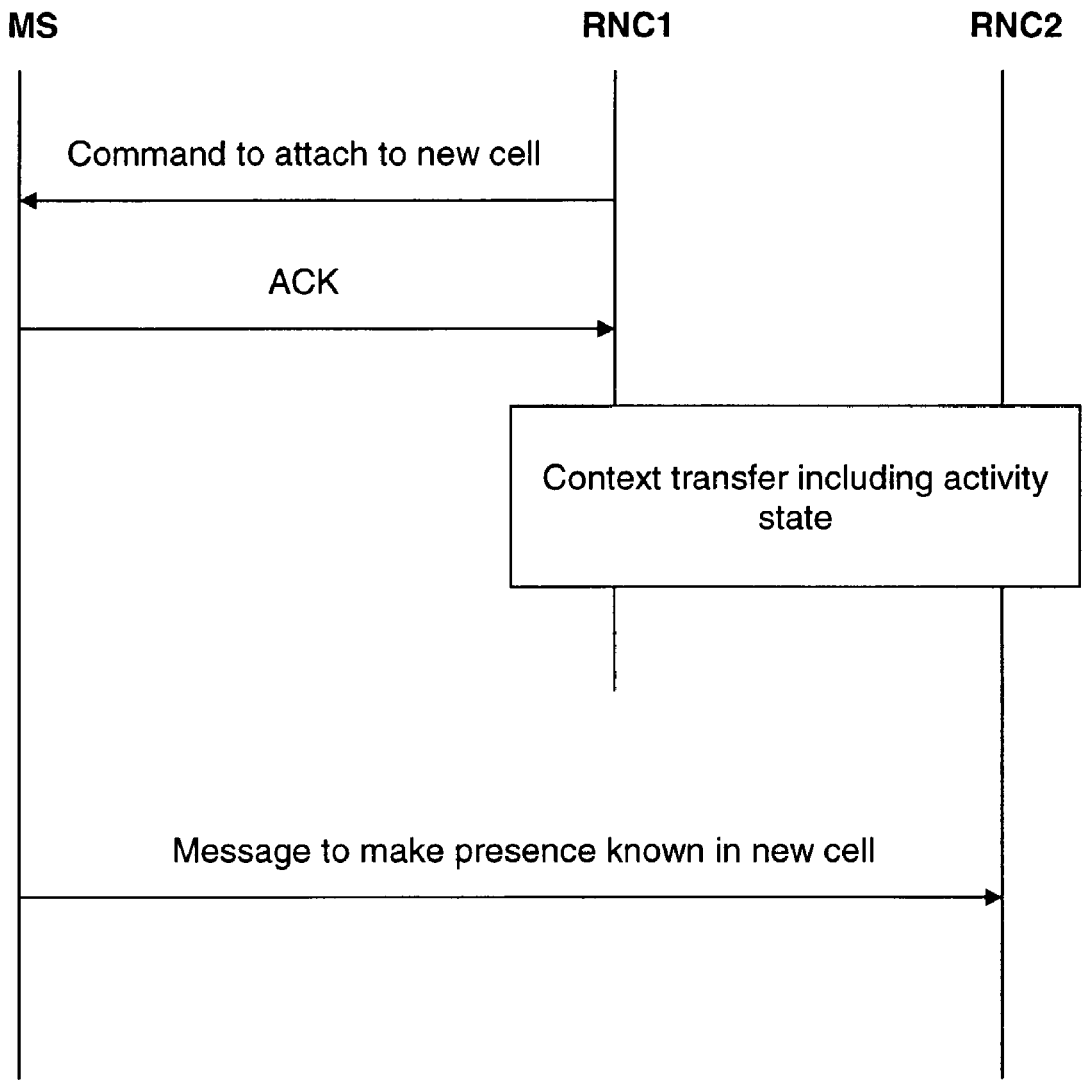
FIG. 1 is a diagram illustrating a conventional context transfer.
Figure 2:
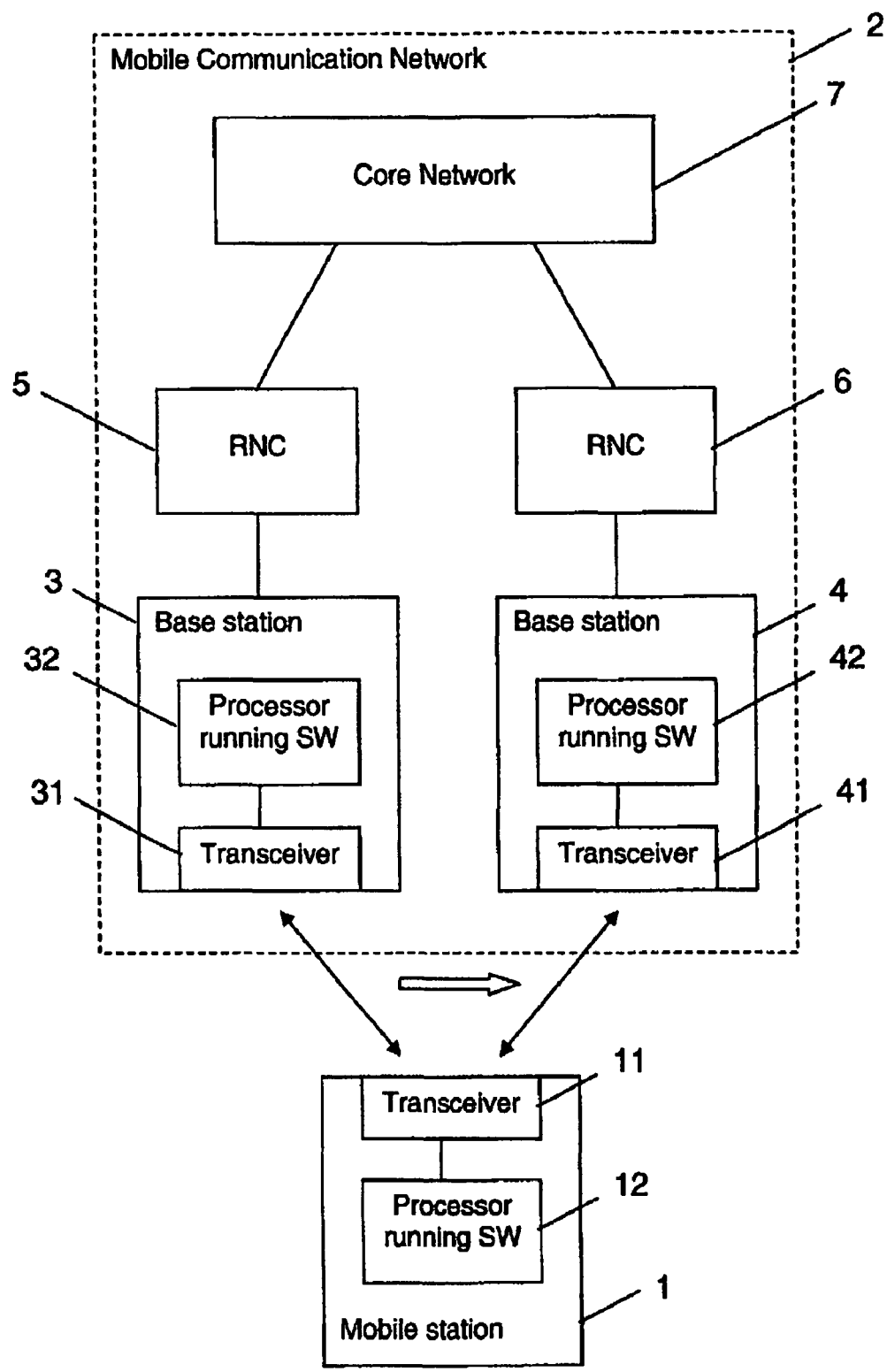
FIG. 2 is a schematic block diagram of a system in accordance with a first embodiment of the invention.

FIG. 2 is a schematic block diagram of a mobile communication system in which a handover may be supported in accordance with the invention.

The system comprises a mobile station 1 and a mobile communication network 2.

The mobile communication network 2 comprises a first base station 3 and a second base station 4. The first base station 3 is connected via a first radio network controller (RNC) 5 to a core network 7. The second base station 4 is connected via a second radio network controller (RNC) 6 to the core network 7. Each base station 3, 4 comprises a transceiver 31, 41 and a processing component 32, 42. The respective transceiver 31, 41 enables a data exchange via a radio interface with mobile stations. The processing component 32, 42 runs a software SW, which realizes partly functions of a conventional radio network controller as well.

The mobile station 1 comprises equally a transceiver 11 and a processing component 12. The transceiver 11 enables a data exchange via a radio interface with one of the base stations 3, 4.

Figure 3:
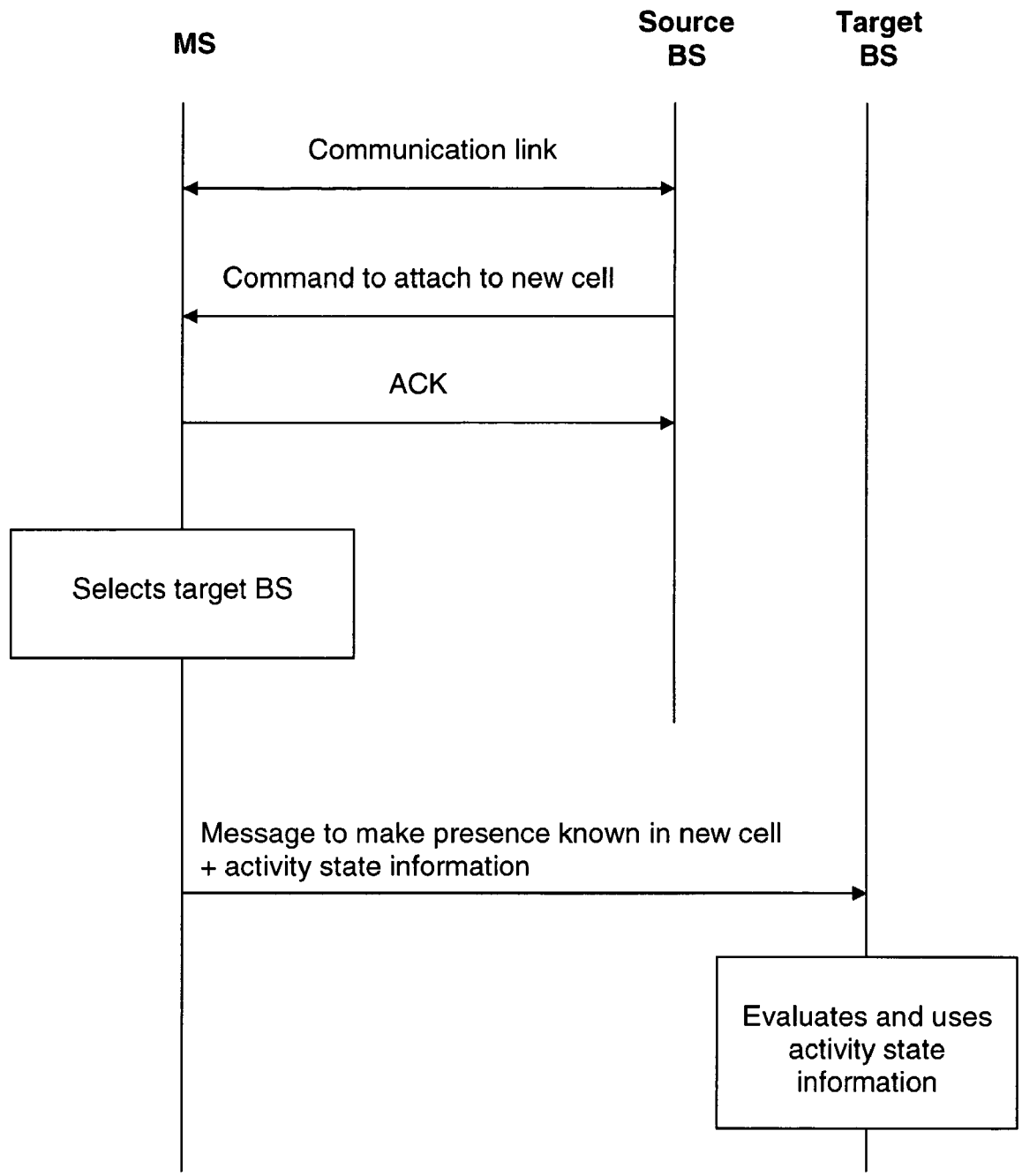
FIG. 3 is a diagram illustrating a first possible operation in the system of FIG. 2.

FIG. 3 is a diagram illustrating a support of a handover in the system of FIG. 2.

In the diagram, a first vertical line on the left hand side represents the mobile station (MS) 1. A second vertical line in the middle represents the first base station 3 as a source base station (BS). A third vertical line on the right hand side represents the second base station 4 as a target base station (BS).

The mobile station 1 is currently accessing the mobile communication network 2 via the source base station 3.

The processing component 32 of the source base station 3 then detects at some point of time that a handover to another base station 4 should be performed, for instance because the signal strength of signals received by the mobile station 1 falls below a predetermined level as the mobile station 1 moves. Thereupon, the processing component 32 of the source base station 3 causes a transmission of a command to attach to a new cell to the mobile station 1, that is, a command to associate itself with another base station.

The mobile station 1 receives this command, and the processing component 12 of the mobile station 1 causes a transmission of an acknowledgement message 'ACK' of this command to the source base station 3. Moreover, the processing component 12 of the mobile station 1 selects another base station, to which it may associate itself. By way of example, it may detect that signals from the target base station 4 are received with satisfying signal strength.

Next, the mobile station 1 associates itself with the selected target base station 4. To this end, the processing component 12 of the mobile station 1 causes a transmission of a message to the target base station 4, which indicates the presence of the mobile station 1 in the new cell covered by the target base station 4. This message includes in addition information on the activity state of the mobile station 1. The information on the activity state includes an indication of the time instant at which user data was last transmitted to the source base station 3 or received from the source base station 3. In some cases, the activity state information might be transmitted instead of padding bits, which would have to be transmitted otherwise. This way, the activity state information could be transmitted without requiring any additional radio resources.

The target base station 4 receives the message and provides it to its processing component 42. The processing component 42 evaluates and uses the included activity state information. The indication of the time instant when the last user data was exchanged is used by the processing component 42 for instance to initialize timers determining when the mobile station 1 should be commanded into a particular idle mode, like the Active state or the Sleep state. Further, the indication of the time instant when the last user data was exchanged may be used to determine an appropriate discontinuous reception schedule. A discontinuous reception schedule fixes instances of times during which the mobile station 1 can be paged. As a result, the mobile station 1 does not have to monitor the paging channels continuously, but only in accordance with the schedule. In between the fixed instances of time, the mobile station 1 may enter a Sleep state, which allows saving battery power in the mobile station 1.

Since the mobile station 1 transmits information on its current activity state directly to the target base station 4, the source base station 3 and the target base station 4 are thus not required any more to establish a network internal connection between them in order to transfer the activity state.

Figure 4:
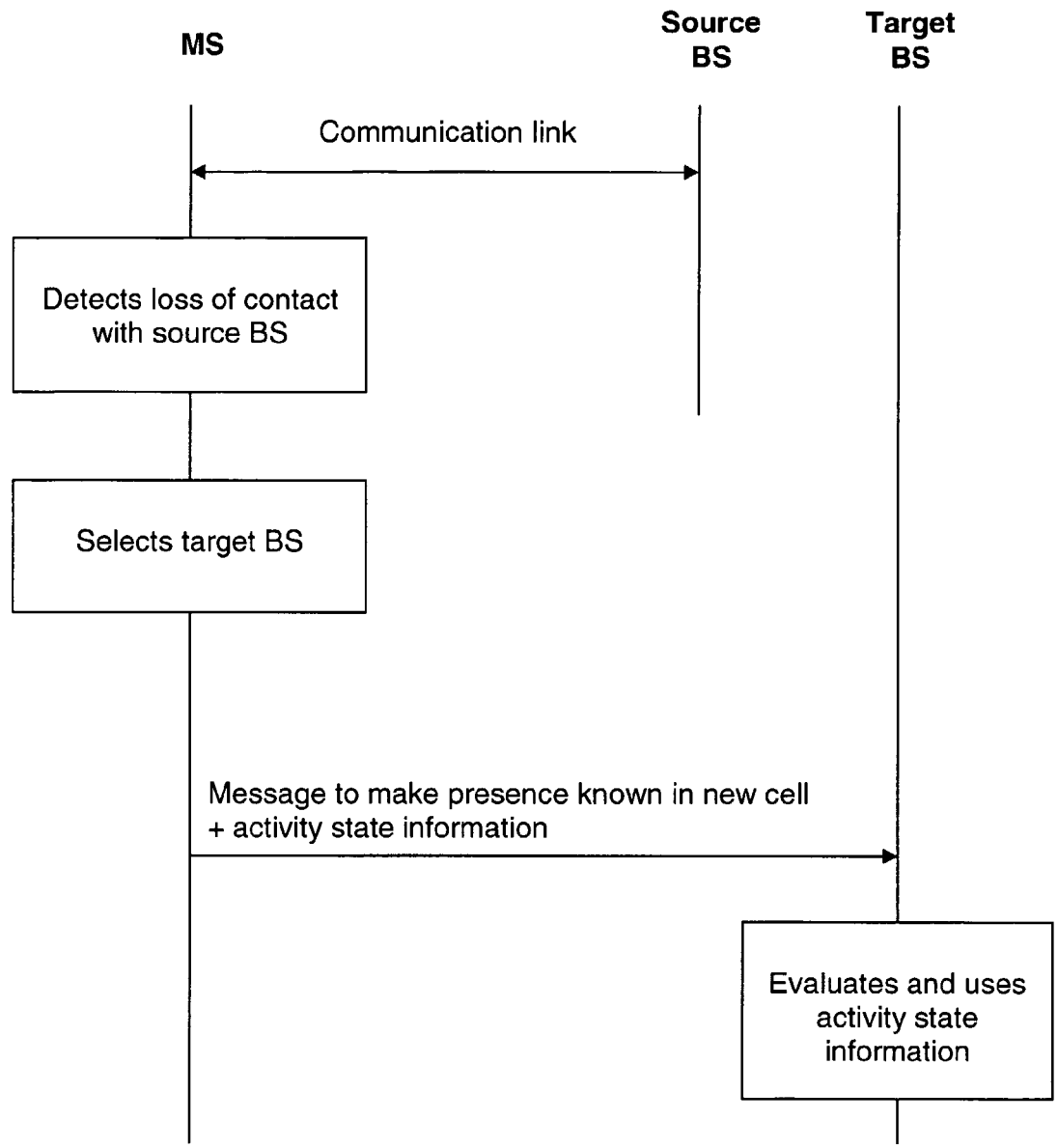
FIG. 4 is a diagram illustrating a second possible operation in the system of FIG. 2.

FIG. 4 is a diagram presenting a slight variation of the process illustrated in FIG. 3.

In the diagram of FIG. 4, a first vertical line on the left hand side represents again the mobile station (MS) 1. A second vertical line in the middle represents again the first base station 3 as a source base station (BS). A third vertical line on the right hand side represents again the second base station 4 as a target base station (BS).

The mobile station 1 is currently accessing the mobile communication network 2 via the source base station 3.

In this case, however, the processing component 12 of the mobile station 1 detects at some point of time that it lost the connection to the source base station 3. Thereupon, the processing component 12 of the mobile station selects a new base station, from which it receives signals with a sufficient signal strength, as target base station.

The further proceeding is the same as described with reference to FIG. 3. That is, the processing component 12 of the mobile station 1 causes a transmission of a message to the selected target base station 4, which indicates the presence of the mobile station 1 in the new cell covered by the target base station 4. This message includes information on the activity state of the mobile station 1. The target base station 4 receives the message and provides it to its processing component 42, which makes use of the included activity state information.

Figure 5:
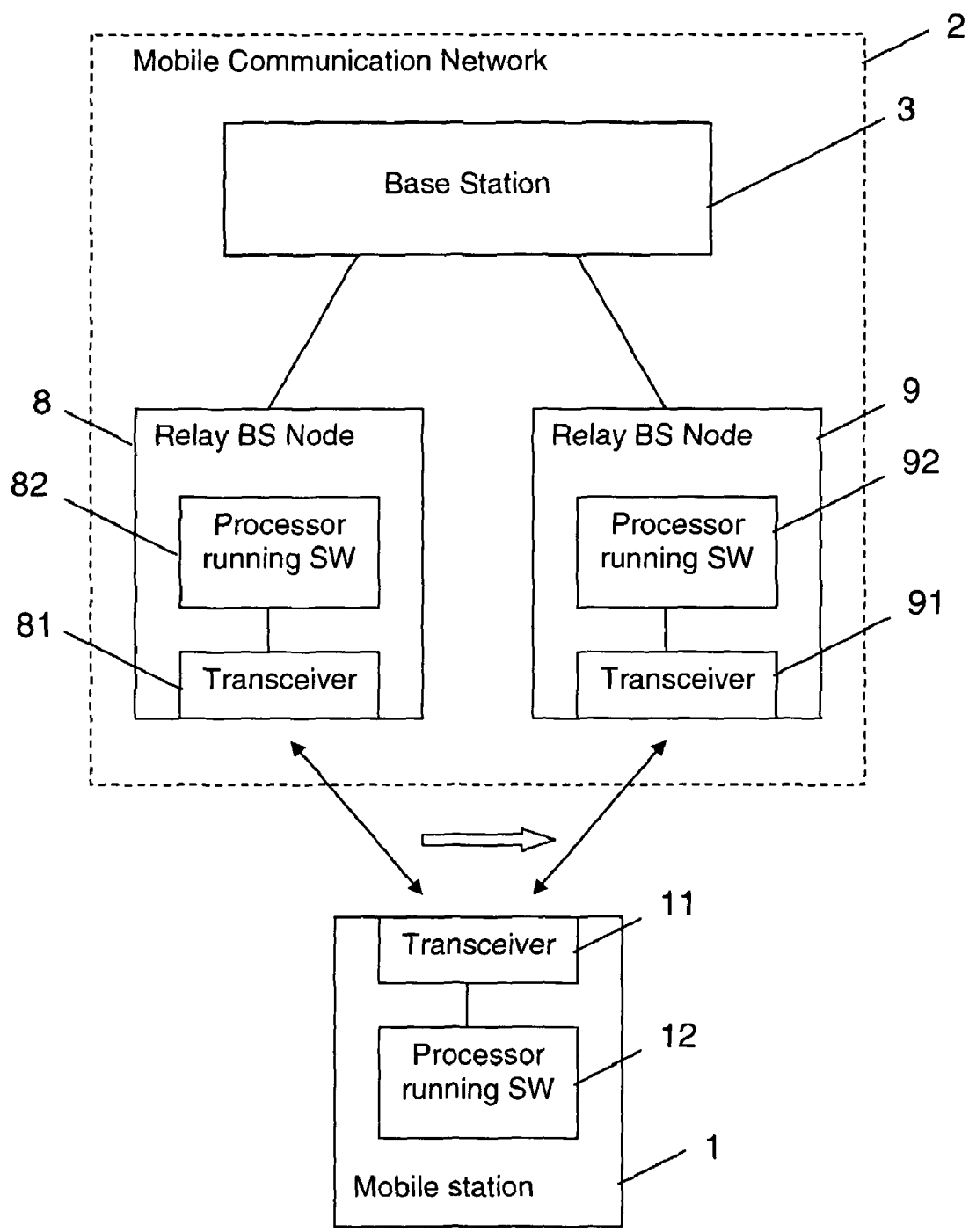
FIG. 5 is a schematic block diagram of a system in accordance with a second embodiment of the invention.

FIG. 5 is a schematic diagram of another mobile communication system in which the invention may be implemented.

This system comprises again a mobile station 1 and a mobile communication network 2. The mobile communication network includes a base station 3 and two relay base station nodes 8, 9, which are both connected to the base station 3. The base station 3 may further be connected via a radio network controller to a core network as in the system of FIG. 2. Each relay base station node 8, 9 comprises a transceiver 81, 91 and a processing component 82, 92. The respective transceiver 81, 91 enables a data exchange via a radio interface with mobile stations. The processing component 32, 42 runs a software SW, which realizes partly functions of a conventional radio network controller as well.

The mobile station 1 corresponds to the mobile station 1 of the system of FIG. 2 and comprises a transceiver 11 and a processing component 12. The transceiver 12 enables in this case a data exchange via the radio interface with one of the relay base station nodes 8, 9.

The mobile station 1 is currently accessing the mobile communication network 2 via the first relay base station node 8.

A handover of the mobile station 1 to the second relay base station node 9 may be supported in exactly the same manner as described with reference to FIG. 3 and/or FIG. 4, except that here, all functions of the source base station 3 are carried out by a source relay base station node 8, and all functions of the target base station 4 are carried out by a target relay base station node 9.

It is to be understood that the components of a mobile communication network described with reference to FIG. 2 and the components of a mobile communication network described with reference to FIG. 5 may be part of the same mobile communication network. In a further variation, a mobile station might also be handed over from a base station to a relay base station node, and vice versa. In this case, all functions of the target base station 4 described with reference to FIG. 3 and/or FIG. 4 are carried out by a target relay base station node 9, or all functions of the source base station 3 described with reference to FIG. 3 and/or FIG. 4 are carried out by a source relay base station node 8, respectively.

It is further to be noted that the described embodiments constitute only some of a variety of possible embodiments of the invention.

What is claimed is:

1. A method comprising:
   transmitting information about an activity state of a mobile station directly from said mobile station to a second radio access unit of a wireless communication network, when said mobile station is to be handed over from a first radio access unit of said wireless communication network to said second radio access unit.

2. The method according to claim 1, wherein said mobile station transmits said information about its activity state in a message which is transmitted as well for another purpose.

3. The method according to claim 2, wherein said message is a message informing said second radio access unit that said mobile station is located in an area served by said second radio access unit.

4. The method according to claim 1, further comprising said mobile station precedingly receiving a command from said first radio access unit to associate itself to said second radio access unit.

5. The method according to claim 1, further comprising said mobile station precedingly detecting that said mobile station has lost connection to said first radio access unit and selecting a second radio access unit serving an area in which said mobile station is located.

6. The method according to claim 1, wherein said information about an activity state of said mobile station comprises an indication of a time instant of a last user data transfer between said mobile station and said first radio access unit.

7. The method according to claim 1, further comprising at said second radio access unit receiving and using said information about an activity state of said mobile station.

8. The method according to claim 1, wherein said first radio access unit and said second radio access unit comprise at least one of a base station and a relay base station node.

9. An apparatus comprising:
   a processing component configured to cause a direct transmission of information about an activity state of a mobile station to a second radio access unit of a wireless communication network via a first radio access unit of said at least one wireless communication network and via a second radio access unit of said at least one wireless communication network when said mobile station is to be handed over from said first radio access unit to said second radio access unit.

10. The apparatus according to claim 9, wherein said processing component is configured to cause a transmission of said information about said activity state in a message which is transmitted as well for another purpose.

11. The apparatus according to claim 10, wherein said message is a message informing said second radio access unit that said mobile station is located in an area served by said second radio access unit.

12. The apparatus according to claim 9, wherein said processing component is further configured to receive a preceding command from said first radio access unit to associate said mobile station to said second radio access unit.

13. The apparatus according to claim 9, wherein said processing component is further configured to detect that said mobile station has lost connection to said first radio access unit and to select a second radio access unit serving an area in which said mobile station is located.

14. The apparatus according to claim 9, wherein said information about an activity state of said mobile station comprises an indication of a time instant of a last user data transfer between said mobile station and said first radio access unit.

15. The apparatus according to claim 9, wherein said apparatus is a mobile station.

16. An apparatus for a radio access unit of a wireless communication network comprising a receiving component configured to receive directly from a mobile station, which is to be handed over to said radio access unit from another radio access unit of a wireless communication network, information on an activity state of said mobile station, and a processing component configured to make use of said information.

17. The apparatus according to claim 16, comprising at least one of a base station and a relay base station node.

18. The apparatus according to claim 16, wherein said receiving component is further configured to receive said information about an activity state of said mobile station in a message which is transmitted as well for another purpose.

19. The apparatus according to claim 18, wherein said message is a message informing said second radio access unit that said mobile station is located in an area served by said second radio access unit.

20. The apparatus according to claim 16, wherein said information about an activity state of said mobile station comprises an indication of a time instant of a last user data transfer between said mobile station and said first radio access unit.

21. The apparatus according to claim 16, wherein said apparatus is said radio access unit.

22. A wireless communication system comprising:
   a mobile station configured to access at least one wireless communication network via a first radio access unit of said at least one wireless communication network and via a second radio access unit of said at least one wireless communication network, respectively, said mobile station comprising a processing component configured to cause a direct transmission of information about an activity state of said mobile station to said second radio access unit when said mobile station is to be handed over from said first radio access unit to said second radio access unit; and
   a radio access unit of a wireless communication network comprising a receiving component configured to receive directly from a mobile station, which is to be handed over to said radio access unit from another radio access unit of a wireless communication network, information on an activity state of said mobile station, and a processing component configured to make use of said information.

23. The wireless communication system according to claim 22, wherein said processing component of said mobile station is configured to cause a transmission of said information about said activity state in a message which is transmitted as well for another purpose.

24. The wireless communication system according to claim 22, wherein said processing component of said mobile station is further configured to receive a preceding command from said first radio access unit to associate said mobile station to said second radio access unit.

25. The wireless communication system according to claim 22, wherein said processing component of said mobile station is further configured to detect that said mobile station has lost connection to said first radio access unit and to select a second radio access unit serving an area in which said mobile station is located.

26. The wireless communication system according to claim 22, wherein said information about an activity state of said mobile station comprises an indication of a time instant of a last user data transfer between said mobile station and said first radio access unit.

27. A computer program product comprising software code stored on a non-transitory readable medium for realizing the following when running in a processing component of a mobile station: causing said mobile station to transmit information about its activity state directly to a second radio access unit of a wireless communication network when said mobile station is to be handed over from a first radio access unit of said wireless communication network to said second radio access unit.

28. The computer program product according to claim 27, wherein the software code which is configured to cause said information about an activity state of said mobile station to be transmitted in a message which is transmitted as well for another purpose.

29. The computer program product according to claim 27, further realizing a preceding action of receiving a command from said first radio access unit to associate itself to said second radio access unit.

30. The computer program product according to claim 27, further realizing a preceding action of detecting that said mobile station has lost connection to said first radio access unit and selecting a second radio access unit serving an area in which said mobile station is located.

31. The computer program product according to claim 27, wherein said information about an activity state of said mobile station comprises an indication of a time instant of a last user data transfer between said mobile station and said first radio access unit.

\* \* \* \* \*